(12) United States Patent
Poerio et al.

(10) Patent No.: US 11,674,849 B2
(45) Date of Patent: Jun. 13, 2023

(54) METHODS AND SYSTEMS FOR DETERMINING A RADAR COMPATIBLE COATING

(71) Applicant: AXALTA COATING SYSTEMS IP CO., LLC, Wilmington, DE (US)

(72) Inventors: Dominic V. Poerio, Philadelphia, PA (US); Neil R. Murphy, Philadelphia, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 77 days.

(21) Appl. No.: 17/349,512

(22) Filed: Jun. 16, 2021

(65) Prior Publication Data
US 2022/0404202 A1 Dec. 22, 2022

(51) Int. Cl.
*G01N 21/55* (2014.01)
*G01J 3/46* (2006.01)

(52) U.S. Cl.
CPC .............. *G01J 3/462* (2013.01); *G01J 3/463* (2013.01); *G01N 21/55* (2013.01); *G01J 2003/466* (2013.01)

(58) Field of Classification Search
CPC ...... G01J 2003/467; G01J 3/463; G01J 3/462; G01S 7/412
See application file for complete search history.

(56) References Cited

U.S. PATENT DOCUMENTS

| 5,119,468 A | 6/1992 | Owens |
| 7,158,672 B2 | 1/2007 | Johansson et al. |
| 7,466,415 B2 | 12/2008 | Gibson et al. |
| 8,065,314 B2 | 11/2011 | Prakash et al. |
| 8,407,014 B2 | 3/2013 | Prakash et al. |
| 8,760,654 B2 | 6/2014 | Kettler |
| 9,874,476 B2 | 1/2018 | Kettler et al. |

(Continued)

FOREIGN PATENT DOCUMENTS

| CN | 110109207 A | * | 8/2019 |
| EP | 2149038 A1 | | 2/2010 |

(Continued)

OTHER PUBLICATIONS

Radar Busters, "VEiL G5 Stealth Coating Review", Nov. 11, 2014 (Year: 2014).*

(Continued)

*Primary Examiner* — Maurice C Smith
(74) *Attorney, Agent, or Firm* — Lorenz & Kopf, LLP

(57) ABSTRACT

Methods and systems for determining a radar compatible coating are provided. In one example, the method includes obtaining a reflectance measurement of a target coating to characterize a color of the target coating. One or more candidate formulas are generated to determine color matching to the color of the target coating. A corresponding color and a corresponding radar property for each of the one or more candidate formulations is predicted. A radar compatible coating composition that is the same or substantially similar in appearance to the target coating is generated. Generating the radar compatible coating composition is based at least in part on the corresponding color and the corresponding radar property for one of the one or more candidate formulations.

20 Claims, 4 Drawing Sheets

(56) References Cited

U.S. PATENT DOCUMENTS

2006/0181707 A1    8/2006   Gibson et al.
2021/0040329 A1    2/2021   Decker et al.

FOREIGN PATENT DOCUMENTS

EP         2887275 A1       6/2015
WO    WO-2022011131 A1 *    1/2022

OTHER PUBLICATIONS

Widyastuti, "The Effect of BaM/PANI Composition with Epoxy Paint Matrix on Single and Double Layers Coating with Spray Coating Method for Radar Absorbing Materials Applications", 2018 (Year: 2018).*

Murphy, Neil R., U.S. Appl. No. 16/951,342, entitled "Methods and Devices for Estimating a Component Transmission Loss of Radar Signal," filed Nov. 18, 2020.

Emilsson, E. P. "Radar Transparency and Paint Compatibility" A Study of Automobile Bumper and Bumper-Skin Complex Permittivities for 77GHz Microwaves Supervisor(s), Dec. 31, 2017.

EPO, European Search Report issued in EP Application No. 22178771.6, dated Oct. 25, 2022.

* cited by examiner

METHODS AND SYSTEMS FOR DETERMINING A RADAR COMPATIBLE COATING

TECHNICAL FIELD

The technical field relates generally to coatings, and more particularly to methods and systems for determining a radar compatible coating that, for example, can be applied onto a component substrate to provide an aesthetic appearance while being substantially transparent to radar.

BACKGROUND

Radar is used in motor vehicles to detect objects for a variety of purposes, such as autonomous driving, adaptive cruise control, automatic braking, and other advanced driver assistance systems. The radar sensor is typically mounted behind a component of the motor vehicle, typically a bumper or vehicle panel, so the component covers the radar device. In this regard, the radar signal must penetrate the bumper when traveling to an object to be detected, and then penetrate the bumper again when reflected off of the object and returning to the vehicle. The bumper, including any coatings applied to the surface of the bumper, can transmit, reflect, or absorb radar. Any reflection or absorption of the radar signal limits the effective detection range of the radar. For the radar to be useful for automatic braking, the effective range of the radar must be at least as far as the braking distance of the vehicle at the driving speed.

If the component, e.g., the bumper or vehicle panel, behind which the radar is mounted is metal, the effective range of the radar is zero, so the components utilized are typically plastic or other non-metallic materials. The component includes the substrate, but also typically includes a coating overlying the substrate. Motor vehicle coatings typically include a basecoat, and often also include a primer coat and/or a clearcoat, with an interface between each layer. The radar typically used in motor vehicles for detecting objects is 77 giga hertz (GHz) band radar, which describes a category of radar that includes frequencies from about 76 to 81 GHz (e.g., W Band).

The transmission of radar through a typical bumper substrate and the coating layers thereon is therefore important for the effective operation of many vehicle radar systems. Further, many vehicle exterior coating or paint systems include ingredients that provide an aesthetically desirable appearance. For example, many coating systems use special effect ingredients, such as metallic effect ingredients or the like, to enhance the aesthetic appearance of the paint. Unfortunately, some of these ingredients can confound a radar system's functionality when applied to a component substrate, such as, for example, a plastic bumper substrate or the like, because these ingredients are not radar compatible (e.g., not substantially transparent or transmissive to radar signals) as they substantially reflect and/or absorb radar signals, thereby limiting or blocking transmission of the radar through the component panel.

Accordingly, it is desirable to provide methods and systems for determining a radar compatible coating that, for example, can be applied onto a component substrate to provide an aesthetic appearance while being substantially transmissive to radar. Furthermore, other desirable features and characteristics of the present disclosure will become apparent from the subsequent detailed description and the appended claims, taken in conjunction with this background.

SUMMARY

Methods and systems for determining a radar compatible coating are provided herein. In accordance with an exemplary embodiment, the method includes obtaining a reflectance measurement of a target coating to characterize a color of the target coating. Using a processor, one or more candidate formulas are generated to determine color matching to the color of the target coating. Using the processor and one or more predictive models, a corresponding color and a corresponding radar property for each of the one or more candidate formulations is predicted. Using the processor, a radar compatible coating composition that is the same or substantially similar in appearance to the target coating including the color is generated. Generating the radar compatible coating composition is based at least in part on the corresponding color and the corresponding radar property for one of the one or more candidate formulations.

In accordance with an exemplary embodiment, the system includes a computer arrangement that includes a processor. The computer arrangement is operative to obtain a reflectance measurement of a target coating to characterize a color of the target coating. Using the processor, one or more candidate formulas is generated to determine color matching to the color of the target coating. Using the processor and one or more predictive models, a corresponding color and a corresponding radar property for each of the one or more candidate formulations is predicted. Using the processor, a radar compatible coating composition that is the same or substantially similar in appearance to the target coating including the color is generated. The radar compatible coating composition is generated based at least in part on the corresponding color and the corresponding radar property for one of the one or more candidate formulations.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
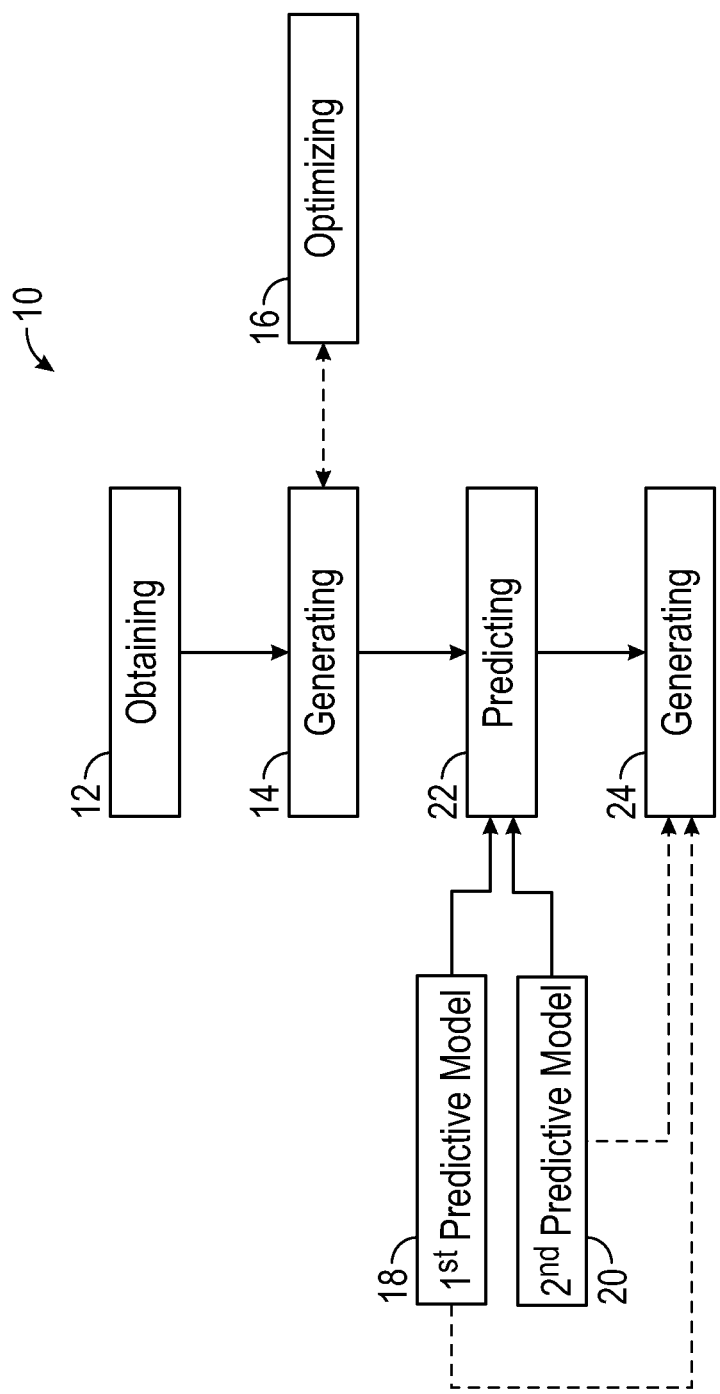
FIG. 1 illustrates a block diagram of a method for determining a radar compatible coating in accordance with an exemplary embodiment.

The following detailed description is merely exemplary in nature and is not intended to limit the various embodiments or the application and uses thereof. Furthermore, there is no intention to be bound by any theory presented in the preceding background or the following detailed description.

A vehicle "component," as used herein, includes a plastic or polymeric substrate with an overlying coating. The term "overlying," as used herein, means the overlying material may be physically touching the underlying substrate, or the overlying material may be physically separated from the underlying substrate by an intervening material, such as an overlying clearcoat that may be separated from an underlying substrate by a basecoat. It is understood that a component may be rotated or moved, so reference to one component overlying another refers to a particular orientation, with the understanding that the actual component may be rotated into a different orientation. The term "vehicle," as used herein, refers to a motor vehicle, such as a car, truck, airplane, or other device propelled through space with a motor or engine. The term vehicle includes vehicles propelled by a motor burning fuel for power, and a vehicle propelled by an engine using electricity. The overlying coating of the component includes one or more of a primer, a basecoat, and a clearcoat.

Various embodiments contemplated herein relate to methods and systems for determining a radar compatible coating that, for example, can be applied onto a component substrate to provide an aesthetic appearance while being substantially transmissive to radar. As used herein, the term "radar compatible" is understood to mean substantially transparent or transmissive to radar signals with relatively low (e.g., radar signal loss is less than about 20%, or 1 dB) or no transmission loss of the radar signal while traveling through the designated medium.

The exemplary embodiments taught herein provide a method that includes obtaining a reflectance measurement of a target coating to characterize a color of the target coating. One or more candidate formulas are generated to determine color matching to the color of the target coating. Using one or more predictive models, a corresponding color and a corresponding radar property is predicted for each of the one or more candidate formulations. A radar compatible coating composition that is the same or substantially similar in appearance to the target coating including the color is generated. The radar compatible coating composition is generated based at least in part on the corresponding color and the corresponding radar property for a selected one of the candidate formulations.

In an exemplary embodiment, advantageously by generating the radar compatible coating composition based on the corresponding color and the corresponding radar property for the selected one of the candidate formulas, the corresponding composition of ingredients of the selected candidate formula can be efficiently modified to minimize a color difference of the corresponding color while changing the corresponding radar properties or constraining the corresponding radar properties to enhance radar transparency or transmissivity of the radar compatible coating composition.

Referring to FIG. 1, a method 10 for determining a radar compatible coating in accordance with an exemplary embodiment is provided. In an exemplary embodiment, the method 10 is a computational method that is performed via a computer arrangement that includes a processor as will discussed in further detail below.

The method 10 includes obtaining (STEP 12) a reflectance measurement of a target coating to characterize a color of the target coating. In one embodiment, the reflectance measurement of the target coating is obtained, for example, by retrieving the reflectance measurement from a database containing a plurality of existing coating reflectance measurements of various target coatings. In another embodiment, the reflectance measurement of the target coating is obtained from a real-time measurement of the target coating using a reflectance measurement device as are well-known in the art, such as from handheld commercial spectrophotometers like the BYK-mac I, the X-Rite MA-T12, or Axalta's Acquire Quantum EFX, or from research grade spectrophotometers such as the Perkin-Elmer LAMBDA series spectrophotometers.

In an exemplary embodiment, the method 10 includes generating (STEP 14), using the processor, one or more candidate formulas for forming coatings to determine color matching to the color of the target coating. As is well known to those skilled in the art, the color match quality can be quantified by numerous metrics, for instance the sum of squared differences between the target and candidate reflectance spectra at multiple illumination and detection angles, or the average CIE94 color difference between the target and candidate color at multiple illumination and detection angles. In an exemplary embodiment, the one or more candidate formulas are obtained via a brute force search, a genetic algorithm, or alternatively, by a software implemented expert system. In a brute force search, all possible formulas are exhaustively evaluated by testing all combinations of ingredients from a given paint system. In a genetic algorithm approach, a candidate population is generated and algorithmically subjected to processes similar to gene mixing (crossover, mutation, etc.), as is well understood by those skilled in the art. In a software implemented expert system, heuristic algorithms are utilized to reduce the search space and calculation times for generating the candidate formulas, for instance, by starting with a radar incompatible target formula and generating a radar compatible candidate by replacing a highly radar incompatible ingredient with a radar compatible ingredient that is largely similar in color behavior.

The candidate formulas each include corresponding compositions of ingredients. For example, each of the candidate formulations may include one or more types of resins, such as an acrylic resin, an epoxy resin, a polyurethane resin, and/or the like, various additives, promoters, curing agents, a water and/or solvent-based carrier that flashes off during drying or curing of the coating composition, colorants, pigments, such as effect pigment flakes, interference flakes, colored pigments, or the like. In one embodiment, various candidate formulations may be developed from scratch (e.g., new or not an existing formulation) in which case, for example, an optimization algorithm, commonly available to those skilled in the art, can be used to fine-tune or optimize (STEP 16) the concentrations of ingredients within the corresponding composition of ingredients of one or more of the candidate formulas to improve color matching to the color of the target coating.

In an exemplary embodiment, a radar incompatible formula may already exist. In such a case, a software implemented expert system can very quickly generate radar compatible candidate formulas by using color predictive models, well known to those skilled in the art, to find radar compatible replacement ingredients for largely radar incompatible ingredients present in the formula.

In an exemplary embodiment, the method 10 further includes predicting (STEP 22), using the processor and one or more predictive models 18 and 20, a corresponding color and a corresponding radar property for each of the one or more candidate formulations. In an exemplary embodiment, two predictive models 18 and 20 are used, a first predictive model 18 that is configured to predict a corresponding color for each of the one or more candidate formulations, and a second predictive model 20 that is configured to predict a radar property for each of the one or more candidate formulations. Predictive models that are configured to predict colors for candidate formulations are well-known in the industry. A non-limiting example of predictive model 18 that is used to predict colors for candidate formulations is described in U.S. Pat. No. 7,466,415, filed May 6, 2004, which claims priority to Provisional Patent Application No. 60/468,595, filed on May 7, 2003, which is owned by the assignee of the present application and is hereby incorporated by reference in its entirety for all purposes. A non-limiting example of a predictive model 20 that is used to predict a radar property, such as a radar transmission property, for example, a permittivity response of an ingredient, a coating formulation, and/or a coating formed from the coating formulation, is described in U.S. patent application Ser. No. 16/951,342, filed on Nov. 18, 2020, which is owned by the assignee of the present application and is hereby incorporated by reference in its entirety for all purposes. In an exemplary embodiment, the predictive model 20 predicts the corresponding radar property for each of the candidate formulations by estimating a corresponding coating permittivity for each of the candidate formulations.

In an exemplary embodiment, the method 10 further includes generating (STEP 24), using the processor, a radar compatible coating composition that is the same or substantially similar in appearance to the target coating including the color. The radar compatible coating composition may be generated based entirely on the corresponding color and the corresponding radar property for a selected one of the candidate formulations. Alternatively, the radar compatible coating composition may be generated based at least in part on the corresponding color and the corresponding radar property for a selected one of the candidate formulations. For example, the radar compatible coating composition may be generated based the color, sparkle, and the corresponding radar property. In this case, both the color and sparkle of the radar compatible coating is the same or substantially similar in appearance to the target coating. Alternatively, the radar compatible coating composition may be generated based the color and the radar property. In this case, the color of the radar compatible coating is the same or substantially similar in appearance to the target coating.

In an exemplary embodiment, the radar compatible coating composition is the same or substantially similar in appearance to the color of the target coating. In an exemplary embodiment, the selected one of the candidate formulations is color matched to the target coating, for example, as characterized by reflectance measurements taken at various angles. For example, color matching between the selected one of the candidate formulations and the target coating may be characterized by reflectance measurements taken at a 45° illumination angle with signal detection occurring at a variety of aspecular angles, often from about −15° to about 110°.

Figures 3A, 3B, 3C:
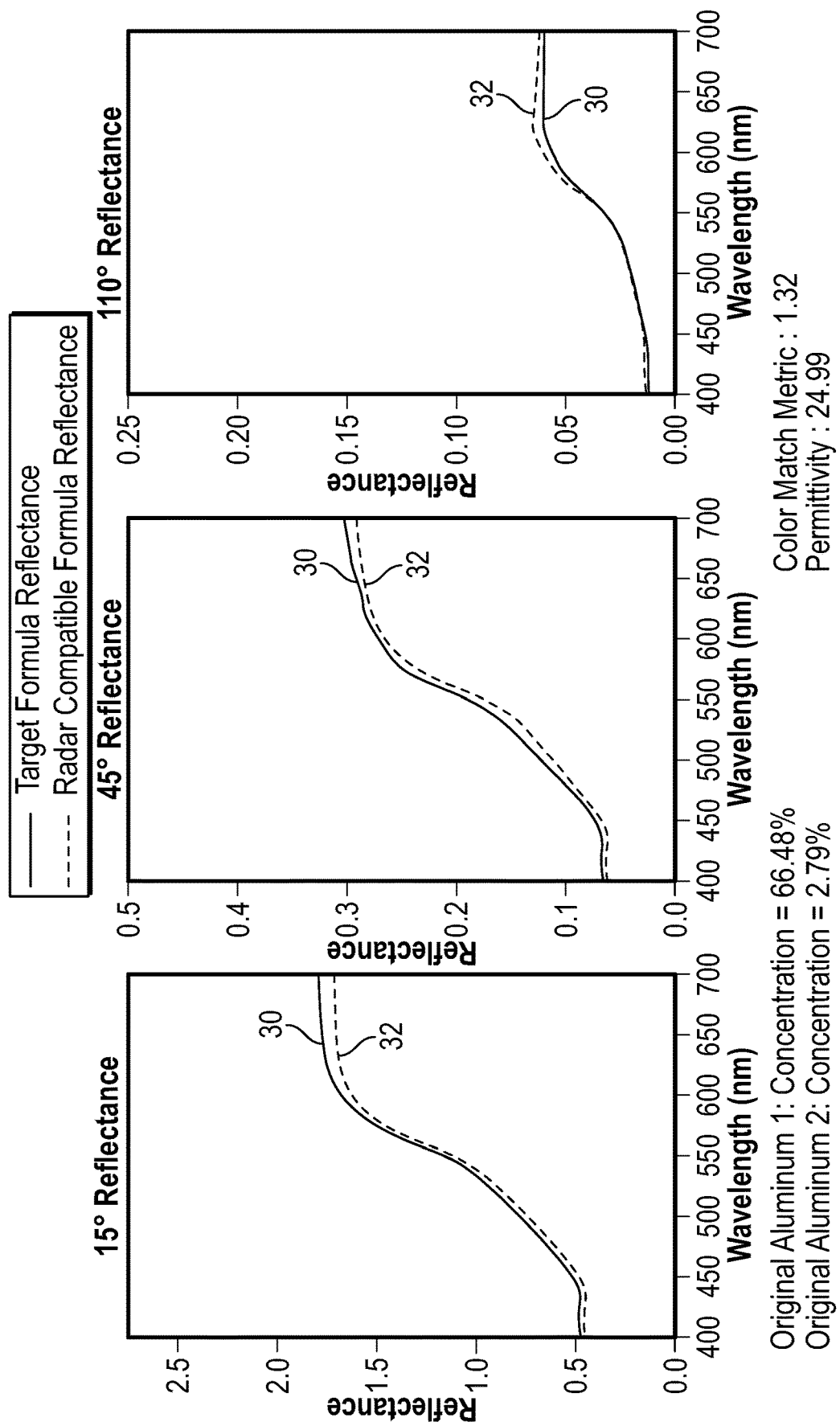
FIG. 3A is a graphical representation of reflectance at 15° versus wavelength index of a candidate formula coating and a radar compatible coating to characterize color similarities and/or color matching in accordance with an exemplary embodiment.
FIG. 3B is a graphical representation of reflectance at 45° versus wavelength index of a candidate formula coating and a radar compatible coating to characterize color similarities and/or color matching in accordance with an exemplary embodiment.
FIG. 3C is a graphical representation of reflectance at 110° versus wavelength index of a candidate formula coating and a radar compatible coating to characterize color similarities and/or color matching in accordance with an exemplary embodiment.

Referring also to FIGS. 3A-C, in an exemplary embodiment, the radar compatible coating composition is generated substantially similar in appearance to the target coating indirectly by color matching the radar compatible coating composition with the color and optionally sparkle of the selected one of the candidate formulations. As illustrated, line 30 represents reflectance measurements of the selected one of the candidate formulations and line 32 represents reflectance measurements of the radar compatible coating from 400 nm to 700 nm with the sample illuminated at a 45° angle relative to the normal, and measurements occurring at the 15°, 45°, and 110° aspecular angles. The lines 30 and 32 are overlaid to demonstrate the similarity in the reflectance spectra. In this example, the color match metric is on an arbitrary scale, with a color match metric below 2 being considered a very good match, and a color match metric of 0 is a perfect color match. The target formula was also able to achieve a permittivity of 25, whereas the original radar incompatible formula had a permittivity of about 50.

Figure 2:
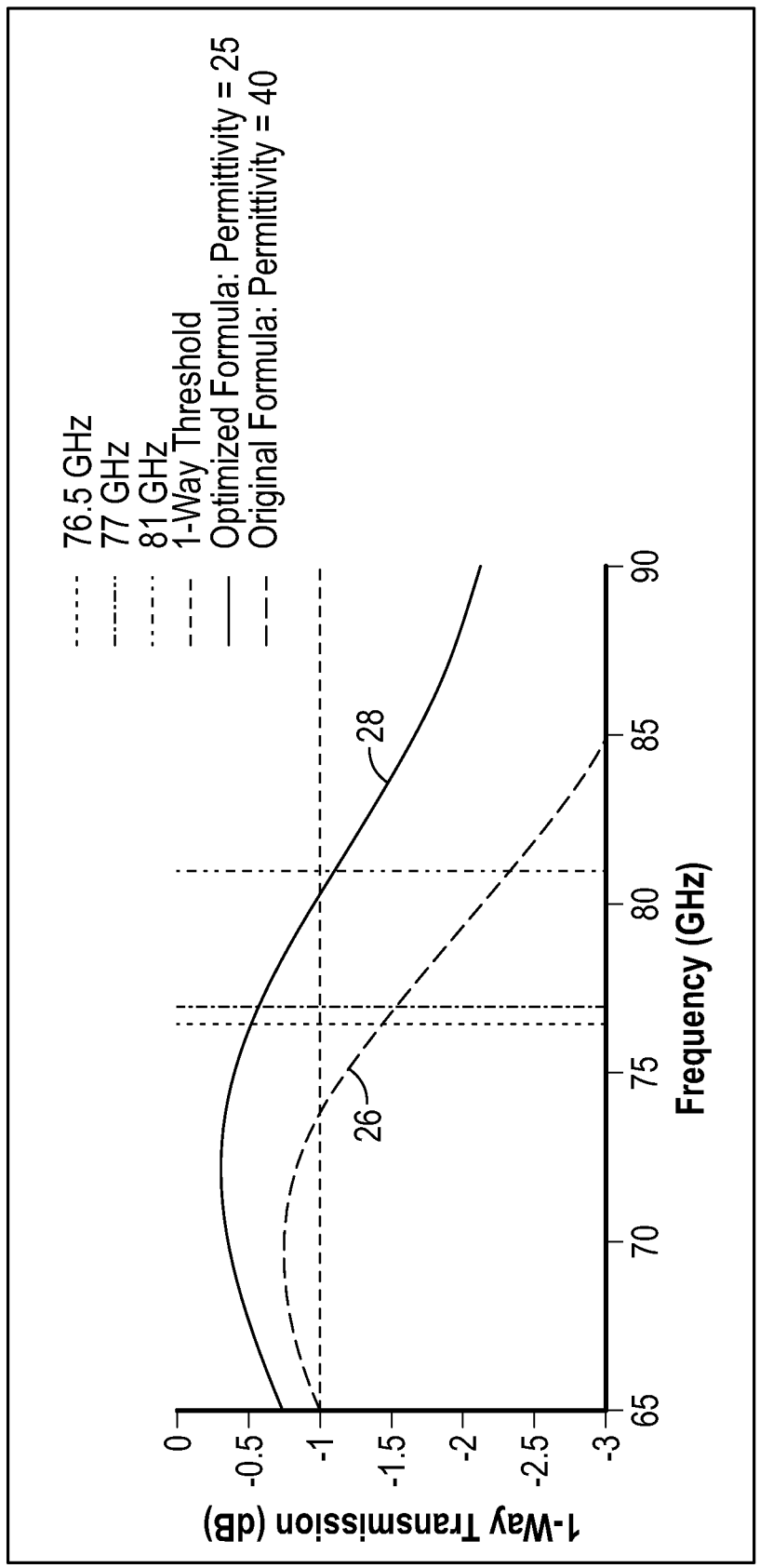
FIG. 2 is a graphical representation of predictions of permittivity responses of a candidate formula coating and a radar compatible coating for evaluating radar performance in accordance with an exemplary embodiment.

Referring to FIGS. 1-2, in an exemplary embodiment, the radar property is radar transmission property, for example, a permittivity response or coating permittivity. Further, in an exemplary embodiment, generating (STEP 24) the radar compatible coating composition includes estimating a coating permittivity 26 of the original composition using the predictive model 20 as discussed above. A corresponding coating permittivity 28 of a selected one of the candidate formulations is either estimated during generating (STEP 24) the radar compatible coating composition or an estimate is used from predicting (STEP 22) the corresponding radar properties for each one of the candidate formulations. The coating permittivity 26 of the original coating composition is compared to the corresponding radar optimized coating permittivity 28 of the selected one of the candidate formulations.

As illustrated in FIG. 2, the coating permittivity 26 of the original coating composition and the corresponding radar optimized coating permittivity 28 of the selected one of the candidate formulations are estimated and compared, for example, over the automotive radar band, which includes frequencies from about 76 to about 81 GHz. In one example, the coating permittivity 26 and the corresponding coating permittivity 28 are compared to each other at discrete frequencies, for example, of 76.5 GHz, 77 GHz, and 81 GHz. In the illustrated example, the coating permittivity 26 of the original coating composition has a coating permittivity of about 40 at 77 GHz which is substantially higher than the corresponding radar optimized coating permittivity 28 of the selected one of the candidate formulations, which has a coating permittivity of about 25 at 77 GHz. The coating permittivity of about 25 for the radar compatible coating composition 28 is about −0.5 dB on a 1-way transmission scale, which translates to about a 90% radar transmission through the coating, while the corresponding coating permittivity 26 of about 40 for the selected one of the candidate formulations is about −1.5 dB on a 1-way transmission scale, which translates to about a 70% radar transmission through the coating. As such, the radar compatible coating composition is substantially more radar transmissive than the selected one of the candidate formulations that, as will be discussed in further detail below, was the original formulation basis that was modified to generate the radar compatible coating composition.

Referring to FIG. 1, in an exemplary embodiment, generating (STEP 24) the radar compatible coating includes modifying, using the processor, the corresponding composition of ingredients of the selected one of the candidate formulas to minimize a color difference of the corresponding color of the selected candidate formula while changing the corresponding radar property or constraining the corresponding radar property to enhance radar compatibility of the radar compatible coating composition. In one embodiment, modifying the corresponding composition of ingredients of the selected candidate formula is performed using a constrained optimization algorithm. In an exemplary embodiment, a software implementation of the algorithm uses the color predictive model to adjust the formula ingredient concentration amounts to minimize the color difference with the target coating, while also simultaneously using the radar or permittivity predictive model to estimate the permittivity of the formula, and the color difference is minimized subject to constraints on the permittivity (for instance, requiring the overall permittivity of the formula be below 25 or 20).

In an exemplary embodiment, the corresponding composition of ingredients of the selected candidate formula is modified by changing one or more of the ingredients in full or in part with one or more other ingredients, and/or changing concentrations of the ingredients to minimize the color difference and to enhance radar compatibility of the radar compatible coating composition. In an exemplary embodiment, the permittivity response is defined as the candidate ingredient's permittivity as a function of the candidate ingredient's concentration in the candidate formula. In one example, the ingredients of the selected candidate formula include a first ingredient having a first permittivity response, and the first ingredient is changed in full or in part with a second ingredient that has a second permittivity response that is less than the first permittivity response. In an exemplary embodiment, the first permittivity response of the first ingredient is above a predetermined threshold permittivity response and the second permittivity response of the second ingredient is at or below the predetermined threshold permittivity response. In an exemplary embodiment, the predetermined threshold permittivity is about 25 at 77 giga hertz (GHz). In another embodiment, the predetermined threshold permittivity is about 10 at 77 giga hertz (GHz).

In an exemplary embodiment, the first ingredient provides an appearance or color effect to the selected candidate formula that is the same or similar to the appearance or color effect of the second ingredient in the radar compatible coating composition. In one example, the first ingredient and the second ingredient are different flake ingredients, for example aluminum flake ingredients and pearlescent flake ingredients, respectively.

Figure 4:
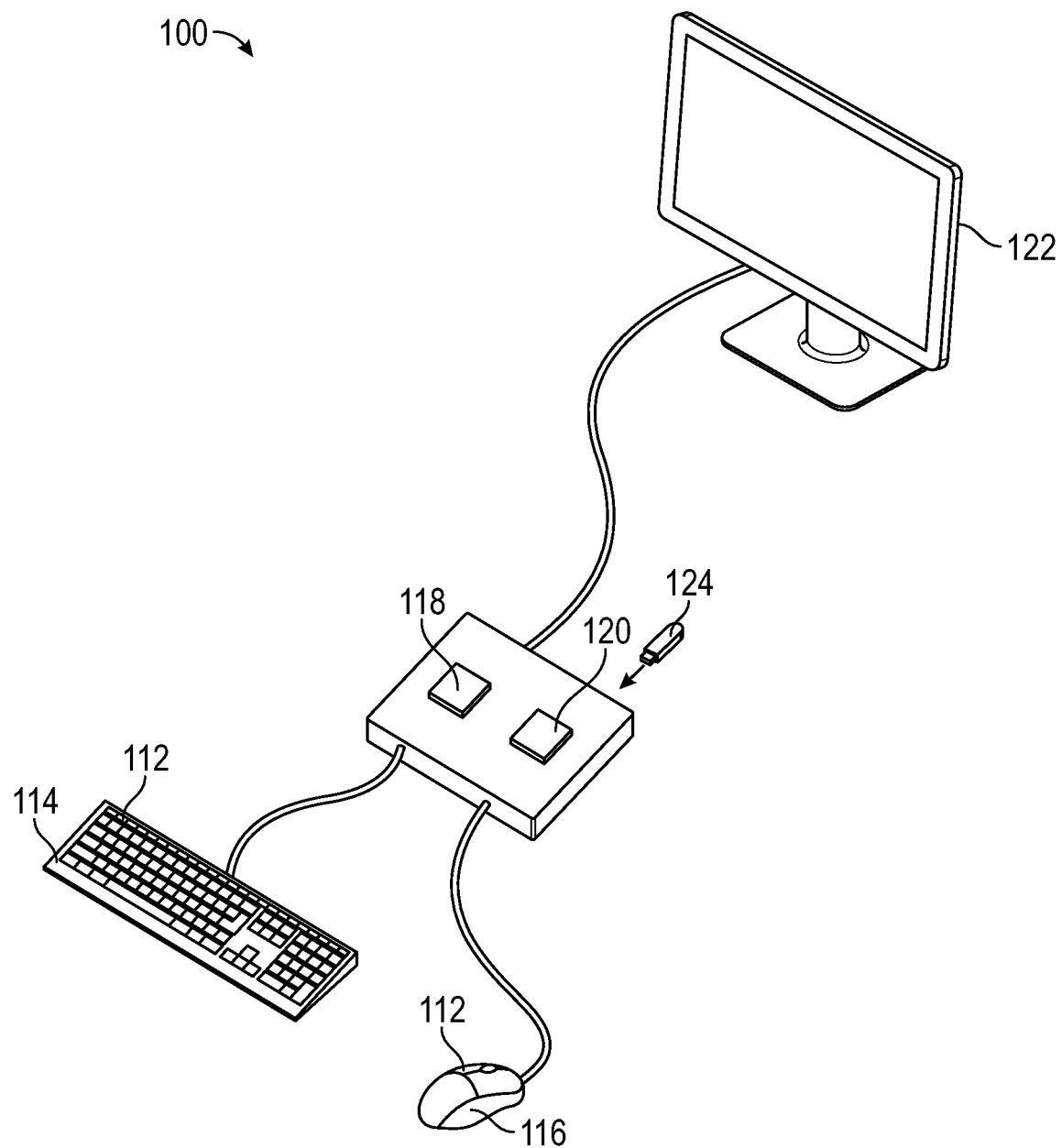
FIG. 4 illustrates a perspective view of a system for determining a radar compatible coating in accordance with an exemplary embodiment.

Referring to FIG. 4, a computer 100 may be used as a device to implement the techniques and methods described herein. The computer 100 may include an input device 112, such as a keyboard 114, a mouse 116, electronic communication devices such as a modem, or a variety of other communication devices. The input device 112 communicates with a processor 118 (processing unit) and/or a memory 120 of the computer, where the processor 118 and the memory 120 communicate with each other. A wide variety of processor 118 and memory 120 embodiments are known to those skilled in the art. The computer 100 also includes an output device 122, such as the monitor illustrated. Other exemplary embodiments of an output device 122 include a modem, a printer, or other components known to those skilled in the art. The methods and techniques described above may be implemented on the computer 100.

A computer readable medium 124 embodies a computer program, where the computer program directs the computer to implement the method and techniques described above. The computer readable medium may be an SD card, a USB storage medium, a floppy disk, a CD-ROM, a DVD, a hard drive, or other devices that are readable by a computer, and that include memory for saving the computer program. In some embodiments, the computer program may be electronically downloaded to the computer, but the downloaded computer program is saved on a tangible device somewhere.

In an exemplary embodiment, the computer program directs the computer to request input from the input device 112, wherein the requested input is directed towards obtaining a reflectance measurement of a target coating to characterize a color of the target coating. The computer program directs the processor 118 to generate one or more candidate formulas to determine color matching to the color of the target coating, where the processor 118 may access one or more mathematical/predictive model(s), an algorithm for example a genetic algorithm, or a software implemented expert system to generate the candidate formulas. The computer program directs the processor 118 to access or otherwise cooperative with one or more predictive models to predict the corresponding color in the corresponding radar property for each of the one or more candidate formulas. Simultaneously or subsequently, the computer program directs the processor 118 to generate a radar compatible coating composition that is the same or substantially similar in appearance to the target coating including color based at least in part on the corresponding color in the corresponding radar property for a selected one of the candidate formulations. The computer program directs the output device 122 to present the radar compatible coating composition including its associated color and radar property, and/or any other information as mentioned above.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It is understood that various changes may be made in the function and arrangement of elements described in an exemplary embodiment without departing from the scope of the disclosure as set forth in the appended claims.

What is claimed is:

1. A method for determining a radar compatible coating, the method comprising the steps of:
    obtaining a reflectance measurement of a target coating to characterize a color of the target coating;
    generating, using a processor, one or more candidate formulations to determine color matching to the color of the target coating;
    predicting, using the processor and one or more predictive models, a corresponding color and a corresponding radar property for each of the one or more candidate formulations; and
    generating, using the processor, a radar compatible coating composition that is the same or substantially similar in appearance to the target coating including the color, wherein generating the radar compatible coating composition is based at least in part on the corresponding color and the corresponding radar property for one of the one or more candidate formulations.

2. The method of claim 1, wherein the one or more candidate formulations each comprises a corresponding composition of ingredients, and wherein generating the radar compatible coating comprises:

modifying, using the processor, the corresponding composition of ingredients of one of the candidate formulations to minimize a color difference of the corresponding color of the one of the candidate formulations while changing the corresponding radar property or constraining the corresponding radar property to enhance radar compatibility of the radar compatible coating composition.

3. The method of claim 2, wherein modifying comprises modifying the corresponding composition of ingredients of one of the candidate formulations further using a constrained optimization algorithm.

4. The method of claim 2, wherein generating the one or more candidate formulations further includes optimizing, using the processor and an optimization algorithm, concentrations of ingredients within the corresponding composition of ingredients of one of the candidate formulations subsequent to modifying to further improve color matching to the color of the target coating.

5. The method of claim 2, wherein modifying the corresponding composition of ingredients of the one of the candidate formulations comprises changing one or more of the ingredients in full or in part with one or more other ingredients, and/or changing concentrations of the ingredients to minimize the color difference and to enhance radar compatibility of the radar compatible coating composition.

6. The method of claim 5, wherein the ingredients of the one of the candidate formulations comprises a first ingredient having a first permittivity response, and wherein modifying the ingredients of the one of the candidate formulations comprises changing the first ingredient in full or in part with a second ingredient that has a second permittivity response that is less than the first permittivity response.

7. The method of claim 6, wherein the first permittivity response of the first ingredient is above a predetermined threshold permittivity response and the second permittivity response of the second ingredient is at or below the predetermined threshold permittivity response.

8. The method of claim 7, wherein the predetermined threshold permittivity is 25 at 77 giga hertz (GHz).

9. The method of claim 8, wherein the predetermined threshold permittivity is 10 at 77 giga hertz (GHz).

10. The method of claim 6, wherein modifying the corresponding composition of ingredients of the one of the candidate formulations comprises further comprises changing the concentration of the second ingredient relative to the concentration of the first ingredient.

11. The method of claim 6, wherein the first ingredient provides an appearance or color effect to the one of the candidate formulations that is the same or similar to the appearance or color effect of the second ingredient in the radar compatible coating composition.

12. The method of claim 11, wherein the first ingredient and the second ingredient are different flake ingredients.

13. The method of claim 1, wherein predicting the corresponding radar property for each of the one or more candidate formulations comprises estimating a corresponding coating permittivity for each of the one or more candidate formulations.

14. The method of claim 13, wherein generating the radar compatible coating composition comprises;
estimating a coating permittivity of the radar compatible coating composition;
estimating or using an estimate of a corresponding coating permittivity of one of the one or more candidate formulations; and
comparing the coating permittivity of the radar compatible coating composition to the corresponding coating permittivity of the one of the one or more candidate formulations.

15. The method of claim 1, further comprising the step of:
obtaining the one or more candidate formulations by a brute force search.

16. The method of claim 1, further comprising the step of:
obtaining the one or more candidate formulations using the processor and a genetic algorithm.

17. The method of claim 1, further comprising the step of:
obtaining the one or more candidate formulations using the processor and a software implemented expert system.

18. The method of claim 1, wherein generating the one of more candidate formulations includes optimizing, using the processor and an unconstrained optimization algorithm, to minimize a function that simultaneously minimizes the color difference and penalizes deviations from one or more different target coating properties.

19. The method of claim 1, wherein obtaining the reflectance measurement of the target coating comprises obtaining the reflectance measurement of the target coating from a database of existing coating reflectance measurements or from a real-time measurement.

20. A system for determining a radar compatible coating, the system comprising:
a computer arrangement including a processor and operative to:
obtain a reflectance measurement of a target coating to characterize a color of the target coating;
generate, using the processor, one or more candidate formulations to determine color matching to the color of the target coating;
predict using the processor and one or more predictive models, a corresponding color and a corresponding radar property for each of the one or more candidate formulations; and
generate, using the processor, a formulation of a radar compatible coating composition that is the same or substantially similar in appearance to the target coating including the color, wherein the formulation of the radar compatible coating composition is generated based at least in part on the corresponding color and the corresponding radar property for one of the one or more candidate formulations.

* * * * *